United States Patent [19]

Betensky

[11] Patent Number: 5,485,313
[45] Date of Patent: Jan. 16, 1996

[54] ZOOM LENS SYSTEMS

[75] Inventor: Ellis I. Betensky, Redding, Conn.

[73] Assignee: Polaroid Corporation, Cambridge, Mass.

[21] Appl. No.: 144,126

[22] Filed: Oct. 27, 1993

[51] Int. Cl.[6] .................................................. G02B 15/14
[52] U.S. Cl. ......................... 359/689; 359/739; 359/740
[58] Field of Search .................................... 359/689, 683, 359/676, 739, 740

[56] References Cited

U.S. PATENT DOCUMENTS

| | | | |
|---|---|---|---|
| 4,198,127 | 4/1980 | Itoh | 350/184 |
| 4,304,466 | 12/1981 | Betensky | 350/426 |
| 4,412,725 | 11/1983 | Tachihara et al. | 350/426 |
| 4,586,793 | 5/1986 | Tanaka et al. | 350/426 |
| 4,776,228 | 10/1988 | Razzacki et al. | 74/339 |
| 5,357,374 | 10/1994 | Ohno | 359/689 |

FOREIGN PATENT DOCUMENTS

| | | |
|---|---|---|
| 62-72114 | 4/1987 | Japan . |
| 62-12456 | 6/1987 | Japan . |

*Primary Examiner*—Scott J. Sugarman
*Attorney, Agent, or Firm*—Francis J. Caufield

[57] ABSTRACT

Zoom lens systems for use with moderately large image formats, such as those found in instant photography cameras, are provided. The systems include three lens units arranged in a negative/positive/negative power sequence and have a fixed aperture stop associated with the unit nearest the image. The positive unit is used for zooming and either the first or the third negative unit is used for compensating and focusing. Alternatively, the negative unit nearest the image is used for compensating and the negative unit farthest from the image is used for focusing. The systems achieve a long back focal length, a short front vertex to image distance, and in their simplest embodiments can consist of just three lens elements.

22 Claims, 10 Drawing Sheets

ZOOM LENS SYSTEMS

FIELD OF THE INVENTION

This invention relates to zoom lens systems and, in particular, to zoom lens systems for use with moderately large image formats such as those found in instant photography cameras.

BACKGROUND OF THE INVENTION

For general photographic applications, it has been commonly accepted that a practical and economical zoom lens construction is one in which a first unit is used for focusing and two middle units are used for zooming and compensating. Such constructions also include a rearmost unit which contains an iris diaphragm which remains stationary during zooming. This type of lens construction has been used for most telephoto zoom lenses for 35 millimeter single-lens-reflex (SLR) cameras. The construction has provided fixed relative apertures (f-numbers) during zooming and the mechanical convenience of a fixed stop location.

However, with zoom lens ranges extended to include the wide angle region, the consequences of a fixed rear unit were found to be too severe. In particular, the front unit became large and thus heavy and expensive. Also, aberrations became excessive, thus requiring an increased number of lens elements. To overcome these problems, zoom lens systems were developed in which the aperture stop, and thus the exit pupil, moved during zooming. These systems were able to achieve a focal length range extending from about 0.8 to about 1.6 of the film diagonal while still having both a small diameter and a short length. In practice, the 0.8 to 1.6 range was adequate for most applications.

In a 35 millimeter SLR camera, the user views the object to be photographed by means of a viewing system, which includes a movable mirror that initially resides in the optical path following the zoom lens system to divert the image of the object to a viewing screen. This mirror is removed from the optical path prior to exposing the film. By texturing the viewing screen so that it produces a diffuse image, changes in the location of the exit pupil of the zoom lens system can be made effectively imperceptible to the user. Accordingly, for such applications, there is no need to fix the exit pupil location during zooming.

Instant photography cameras or other moderately large image formats impose requirements on zoom lens systems which are more difficult to satisfy than those imposed by 35 millimeter SLR cameras. For example, instant photography cameras use a film format substantially larger than that employed in a 35 millimeter camera, e.g., a diagonal greater than about 90 millimeters as opposed to a diagonal of about 42 millimeters as in conventional 35 millimeter film. If a conventional 35 millimeter SLR viewing system were to be used with such an instant photography camera, the result would be an impractically large camera body.

Consequently, viewing systems have been developed for instant photography cameras in which optical components, such as Fresnel mirrors, are introduced into the optical path between the taking lens and the viewing system's eye lens in order to reduce the size of the image presented to the eye lens. These viewing systems form an image at infinity which can be easily viewed by the user. Also, they image the exit pupil of the taking lens into the user's eye. As a result, the location of the exit pupil of a zoom lens system used with such a viewing system needs to remain substantially fixed with zooming so that the ultimate exit pupil of the zoom lens/viewing system combination remains at the user's eye throughout the zooming range.

As described below, in accordance with the invention, a fixed exit pupil is achieved by means of 1) a fixed aperture stop location for the zoom lens system and 2) locating the aperture stop at the image end of the zoom lens system. This arrangement is in itself advantageous for an instant photography camera because it provides an ideal location for the camera's shutter, namely, at the fixed location of the zoom lens system's aperture stop.

In addition to imposing the requirement that the exit pupil of a zoom lens system remains substantially fixed during zooming, instant photography cameras also impose the requirement that the f-number of the zoom lens system needs to vary in a controlled manner as zooming takes place. This requirement arises from the fact that in its preferred embodiments, the battery contained in the film pack of an instant photography camera provides all the power required for operation of the camera's various functions, including the power for the electronic flash. As a result, the amount of power allocated for the flash is limited by design. This, in turn, means that the amount of increase in the flash output available to compensate for decreases in the aperture of a zoom lens is also limited. This problem becomes more acute at the wide angle setting of the zoom lens, i.e., at the short focal length setting, since filling a wide angle with a flash requires more power than filling a narrow angle.

In general, a zoom lens system for an instant photography camera should have a f-number of about f/10 when the focal length is approximately equal to the film diagonal. For shorter focal lengths, the f-number should decrease, e.g., to approximately f/8. For longer focal lengths, a larger f-number, e.g., f/14, may be acceptable, especially if the camera's electronic flash has a variable angular output.

In addition to the above requirements, a zoom lens system for an instant photography camera should have: 1) a long back focal length sufficient for insertion of one mirror and in some cases three mirrors, e.g., a back focal length about 1.3 times the focal length at the wide angle position for a one mirror system and a back focal length about 1.7 times the focal length at the wide angle position for a three mirror system, 2) as short a front vertex to image distance as possible so as to minimize the storage size of the camera, and 3) small lens diameters in order to minimize weight and cost, e.g., for a 90 millimeter film diagonal, a maximum lens diameter of about 40 millimeters.

Instant photography cameras, however, do have certain characteristics which can be advantageously employed in designing a zoom lens system. In particular, due to the characteristics of instant photography color film, full color correction is in general not needed, e.g., a transverse chromatic aberration of approximately 0.125 millimeters can be tolerated.

In accordance with the invention, this characteristic allows for the use of lens units having strong optical powers and few optical elements. This combination can be employed in the zoom lens systems of the invention because the lens units need not be individually color corrected. Rather, color correction sufficient to satisfy the relatively relaxed requirements of instant photography color film can be achieved through the interaction of the units making up the zoom lens system, even though those units are not themselves individually color corrected.

DESCRIPTION OF THE PRIOR ART

Tachihara et al., U.S. Pat. No. 4,412,725, shows a zoom lens system having two lens units and a fixed aperture stop located after the second lens unit. This system does not include a third lens unit having a negative power. In terms of the requirements of a zoom lens system for an instant photography camera, the Tachihara lens lacks a sufficiently long back focal length and a sufficiently short overall length. Also, the lens system of this patent has a highly complex structure.

Zoom lens systems employing three lens units having a negative/positive/negative power arrangement are shown in U.S. Pat. Nos. 4,586,793, 4,198,127 and 4,304,466, and Japanese Patent Publications Nos. 64-72114 and 62-124516. In each of these designs, the aperture stop moves with the second lens unit.

U.S. Pat. No. 4,776,228 shows a zoom lens system employing three lens units in which the aperture stop is in the third lens unit. The aperture stop, however, moves during zooming and the third lens unit in this case has a positive power.

In view of the foregoing, it is an object of this invention to provide zoom lens systems suitable for use in instant photography cameras, as well as other optical systems having moderately large image formats. More particularly, it is an object of the invention to provide zoom lens systems which have some or all of the following properties: 1) an overall simple construction so that the system can be manufactured economically; 2) a long back focal length; 3) a short overall length; 4) lens elements having small diameters; 5) a substantially fixed exit pupil location during zooming; 6) a substantially fixed aperture stop location during zooming; and 7) a predetermined f-number variation during zooming.

SUMMARY OF THE INVENTION

The invention in accordance with certain of its aspects is a zoom lens system for forming an image. From object to image space, the zoom lens system comprises:

(a) a first lens unit having a negative optical power;

(b) a second lens unit which is on the image side of the first lens unit and has a positive optical power;

(c) a third lens unit which is on the image side of the second lens unit and has a negative optical power; and (d) an aperture stop which is on the image side of the second lens unit;

wherein:

the second lens unit is moveable to change the magnification of the lens system;

either the first lens unit or the third lens unit is 5moveable to focus the lens system and to compensate for changes in focus resulting from movement of the second lens unit; and the aperture stop is substantially fixed during zooming of the lens system.

In accordance with other aspects of the invention,the zoom lens system comprises:

(a) a first lens unit having a negative optical power;

(b) a second lens unit which is on the image side of the first lens unit and has a positive optical power;

(c) a third lens unit which is on the image side of the second lens unit and has a negative optical power; and (d) an aperture stop which is on the image side of the second lens unit;

wherein:

the first lens unit is moveable to focus the lens system;

the second lens unit is moveable to change the magnification of the lens system;

the third lens unit is moveable to compensate for changes in focus resulting from movement of the second lens unit; and the aperture stop is substantially fixed during zooming of the lens system.

As used herein, an aperture stop is considered to be substantially fixed if its motion during zooming is less than about 0.05 times $f_{max}$ and preferably is less than about 0.01 times $f_{max}$, where $f_{max}$ is the system's maximum effective focal length. As indicated above, the aperture stop is located on the image side of the second lens unit and can be before the third lens unit, part of the third lens unit, or after the third lens unit.

In accordance with certain preferred embodiments of the invention, the zoom lens system has some or all of the following properties: (1) the third lens unit is a single lens element; (2) the third lens unit is a single lens element and that element has an index of refraction which is higher than the index of refraction of any other lens element in the lens system; (3) the first lens unit is a single lens element; (4) the first lens unit is a single lens element and that element has at least one aspheric surface; (5) the second lens unit comprises only positive lens elements; (6) the first, second, and third lens units are each a single lens element; (7) the first lens unit is a single lens element, the second lens unit is two positive lens elements, and the third lens unit is a single lens element; (8) the lens system has a maximum effective focal length $f_{max}$ and a minimum effective focal length $f_{min}$ and the size of the aperture stop is adjustable to increase the effective aperture of the lens system as the effective focal length of the lens system decreases from $f_{max}$ to $f_{min}$; (9) the first lens unit has a power whose absolute value is $|\Phi_1|$, the second lens unit has a power $\Phi_2$, the third lens unit has a power whose absolute value is $|\Phi_3|$, and the ratio of $(|\Phi_1|+|\Phi_3|)/\Phi_2$ is between about 1.0 and about 1.5; (10) the second lens unit has a focal length $f_2$ and the ratio of $f_2/f_{max}$ is between about 0.10 and about 0.35; (11) the first lens unit has a focal length whose absolute value is $|f_1|$, the third lens unit has a focal length whose absolute value is $|f_3|$, and (a) the ratio of $|f_1|$ to $f_{min}$ is less than about 0.9, and (b) the ratio of $|f_3|$ to $f_{min}$ is less than about 1.0; (12) the ratio of the magnification of the aperture stop by the first and second lens units at $f_{min}$ to the magnification of the aperture stop by the first and second lens units at $f_{max}$ is less than about 2.0; and (13) the ratio of the back focal length (BFL) to $f_{min}$ is greater than about 1.2.

BRIEF DESCRIPTION OF THE DRAWINGS

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. Briefly, the subject matter of the drawings is as follows.

DESCRIPTION OF THE PREFERRED EMBODIMENTS

Figure 1:
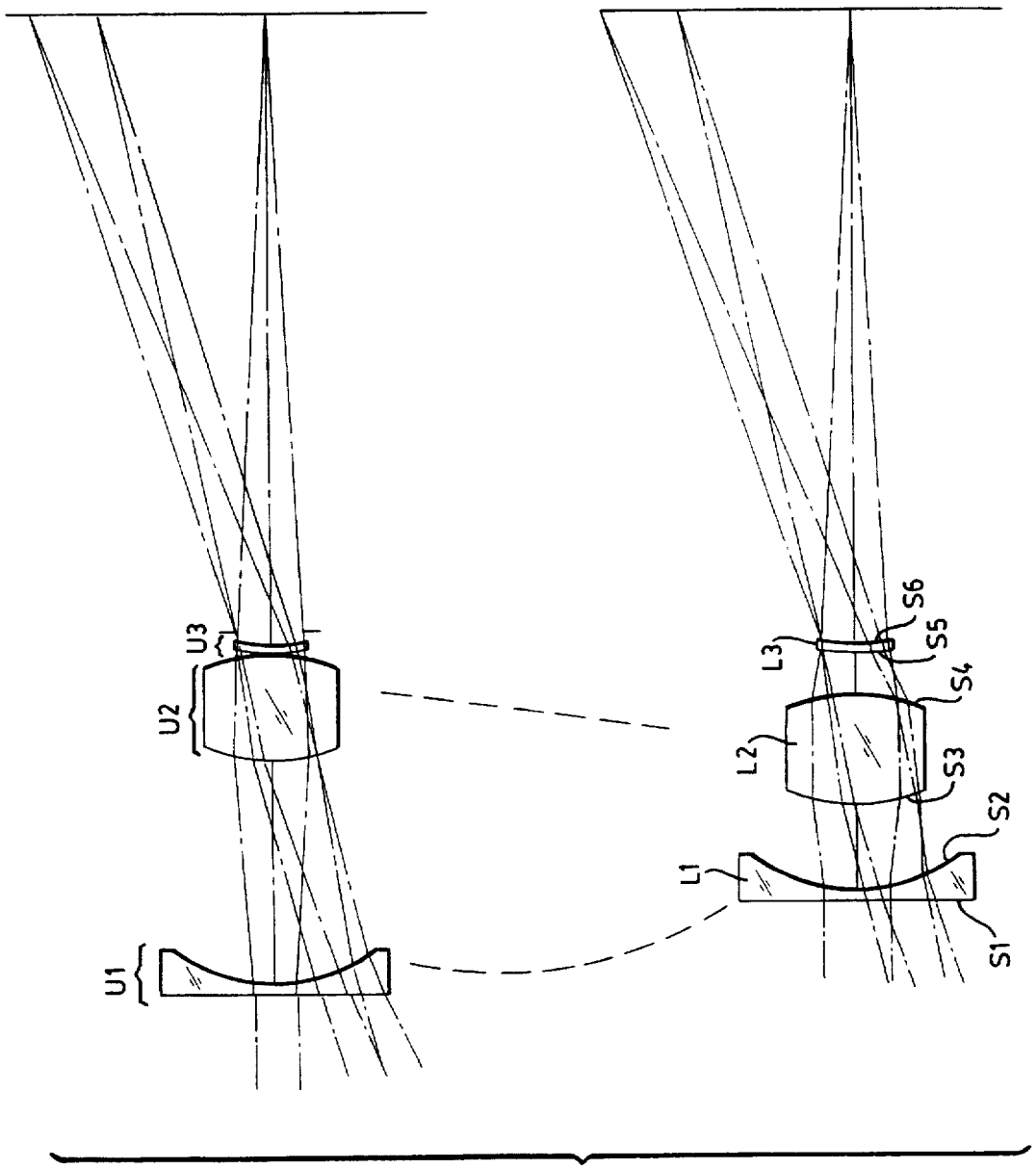
FIGS. 1 through 10 are schematic side views of zoom lens systems constructed in accordance with the invention. The upper portion of each of these drawings shows the lens system in its $f_{min}$ configuration, and the lower portion shows it in its $f_{max}$ configuration. The upper portions also show the location of the aperture stop.

As discussed above, the present invention relates to zoom lens systems for use with image diagonals of moderate size such as those found in instant photography cameras. The lens systems of the invention include three lens units of more or less complexity and performance: a first negative unit which can be used for focusing and also compensating; a second positive unit which moves to change the magnification of the system during zooming; and a third negative unit with which the aperture stop is associated and which can also be moved for compensating or focusing.

The design of the lens systems of the invention is particularly flexible in that while the second unit is the primary zooming unit, either the first or third unit can be used as a compensator, allowing the other to remain fixed in position during zooming. When used as a compensator, a unit's movement serves to compensate for the change in focus caused by movement of the second unit during zooming.

Preferably, the powers of the units are arranged so that the zoom lens systems have a long back focal length (BFL) and a short front vertex to image distance (FVD). To achieve the long BFL and short FVD, as well as to provide small diameters for the lens elements, relatively strong negative powers are used for the first and third units. In this connection, the ratio of $|f_1|$ to $f_{min}$ is preferably less than about 0.9 and the ratio of $|f_3|$ to $f_{min}$ is preferably less than about 1.0. Put other ways, the ratio of $(|\Phi_1|+|\Phi_3|)/\Phi_2$ is preferably between about 1.0 and about 1.5, and/or the ratio of $f_2/f_{max}$ is preferably between about 0.10 and about 0.35.

In addition, it is desirable to maintain a relatively constant value for the pupil magnification of the combined first and second units during zooming. Preferably, this value is near 1.0. In particular, the ratio of the magnification of the aperture stop by the combined first and second lens units at $f_{min}$ to the magnification of the aperture stop by the combined first and second lens units at $f_{max}$ is preferably less than about 2.0. Stated another way, the ratio of the size of the aperture stop, for a constant aperture stop size, as seen through the first and second units at $f_{min}$ and $f_{max}$ is preferably less than about 2.0.

When the zoom lens system satisfies the foregoing condition, the change in the off-axis aberrations of the lens system with zooming is minimized, thus allowing the overall design of the lens system to be simplified. Specifically, near unity pupil magnification, small pupil magnification changes during zooming help reduce aberrations for off-axis image positions. This can most easily be seen if pupil magnification is expressed as an angular ratio $u_{pr}/u'_{pr}$ rather than the equivalent size ratio y'/y, where $u_{pr}$ is the paraxial principal ray entrance angle at the entrance pupil and $u'_{pr}$ is the corresponding angle at the aperture stop. If $u_{pr}=u'_{pr}$ the principal rays do not deviate and the aberration contribution is reduced. If the value of $u'_{pr}$ is considerably greater or smaller than $u_{pr}$ then the aberration contributions are increased. While these increased aberrations can be corrected by using other lens units of the system, for a zoom lens, the lens units are moving so both the compensating aberrations and the aberrations of the unit itself are changing. For this reason, complex designs are needed to correct the units for off-axis aberrations, unless the pupil magnification changes during zooming are small, and preferably the pupil magnification is small for each of the units.

If the zoom range is not too large (e.g., 2:1 or less), the lens systems of the invention can consist of only three lens elements, some of which have aspherical surfaces to achieve acceptable aberration correction.

As the zoom range is increased, the complexity of the design also increases. Divided power or additional aspheres first come into play, and then as the lens powers further increase, lens elements are introduced for color correction. These color correction lens elements have powers opposite to the power of the unit in which they are inserted.

Because the sum of the powers of the units making up the system is generally negative, a difference in refractive index is used to correct for Petzval curvature. Preferably, this is done by using a high index material for the power element of the third unit, e.g., a material having an index of refraction greater than about 1.6. The higher index of refraction material can be a flint type glass. This element can be readily fabricated in glass since it generally does not need to have an aspherical surface.

The lens systems of the invention provide wide latitude with regard to the use of aspherical surfaces in the second unit. The first unit, on the other hand, generally should include an asphere or the addition of positive elements to provide for distortion correction. Elements including aspheres are preferably fabricated of plastic materials which can be economically molded to the needed shapes. For smaller zoom ranges (e.g., 2:1) only a singlet lens is required for the first lens unit. This element should have a large Abbe value, e.g., an Abbe value above about 55, to reduce lateral color.

For use with an electronic flash, the size of the aperture stop can be made adjustable so as to increase the effective aperture of the system as the effective focal length decreases from $f_{max}$ to $f_{min}$. For example, the f-number of the lens system can decrease from about 14 to about 8 as zooming takes place.

Figure 2:
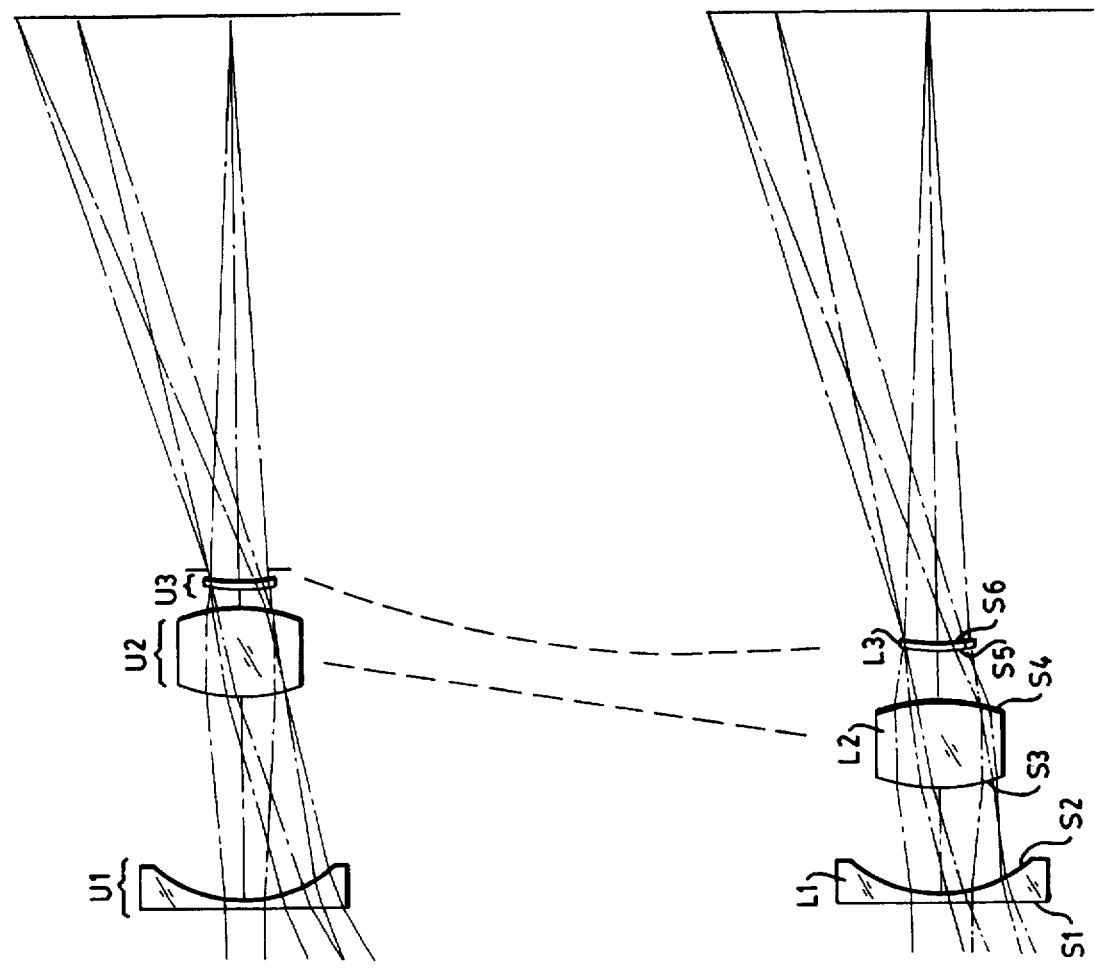
Figure 3:
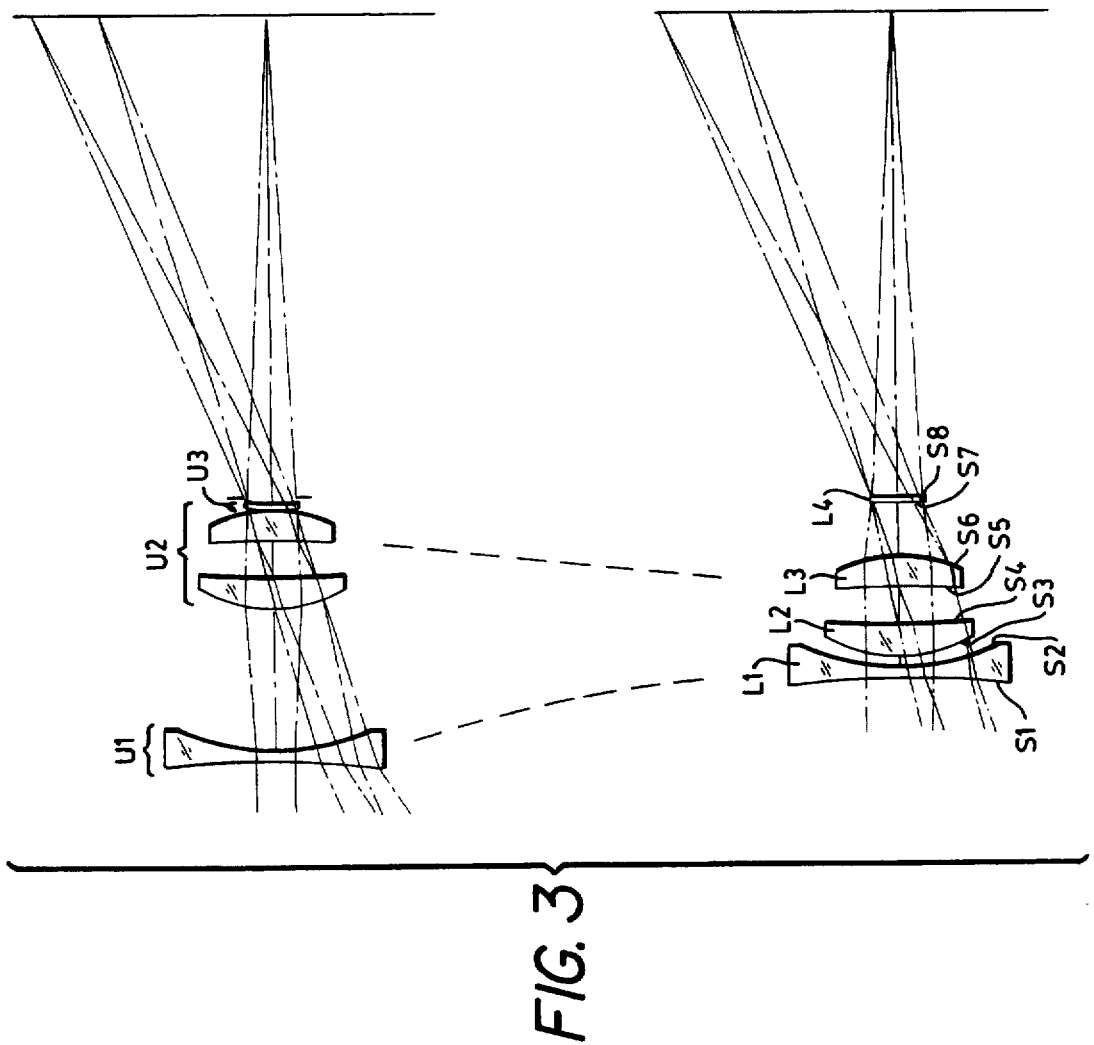
Figure 4:
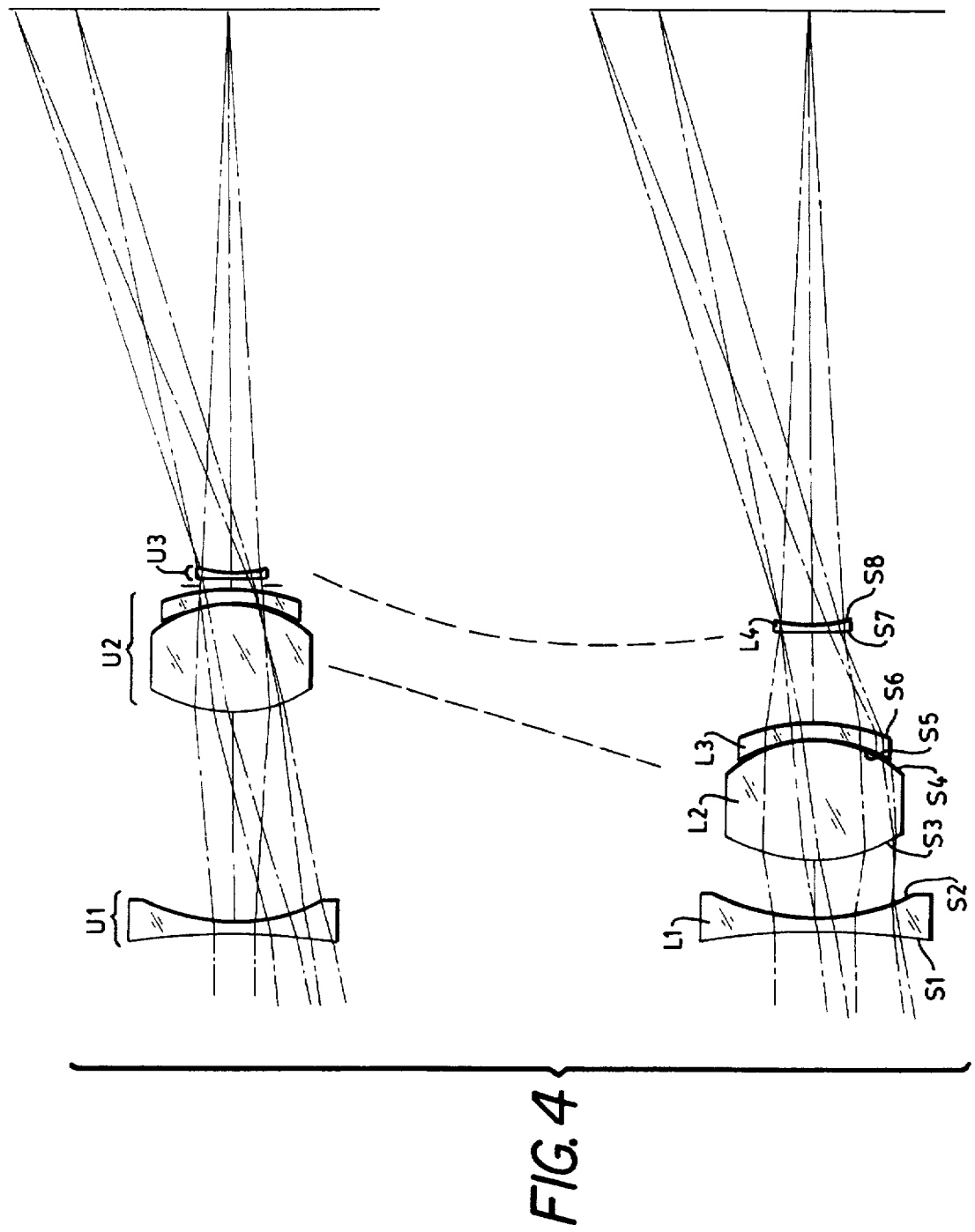
Figure 5:
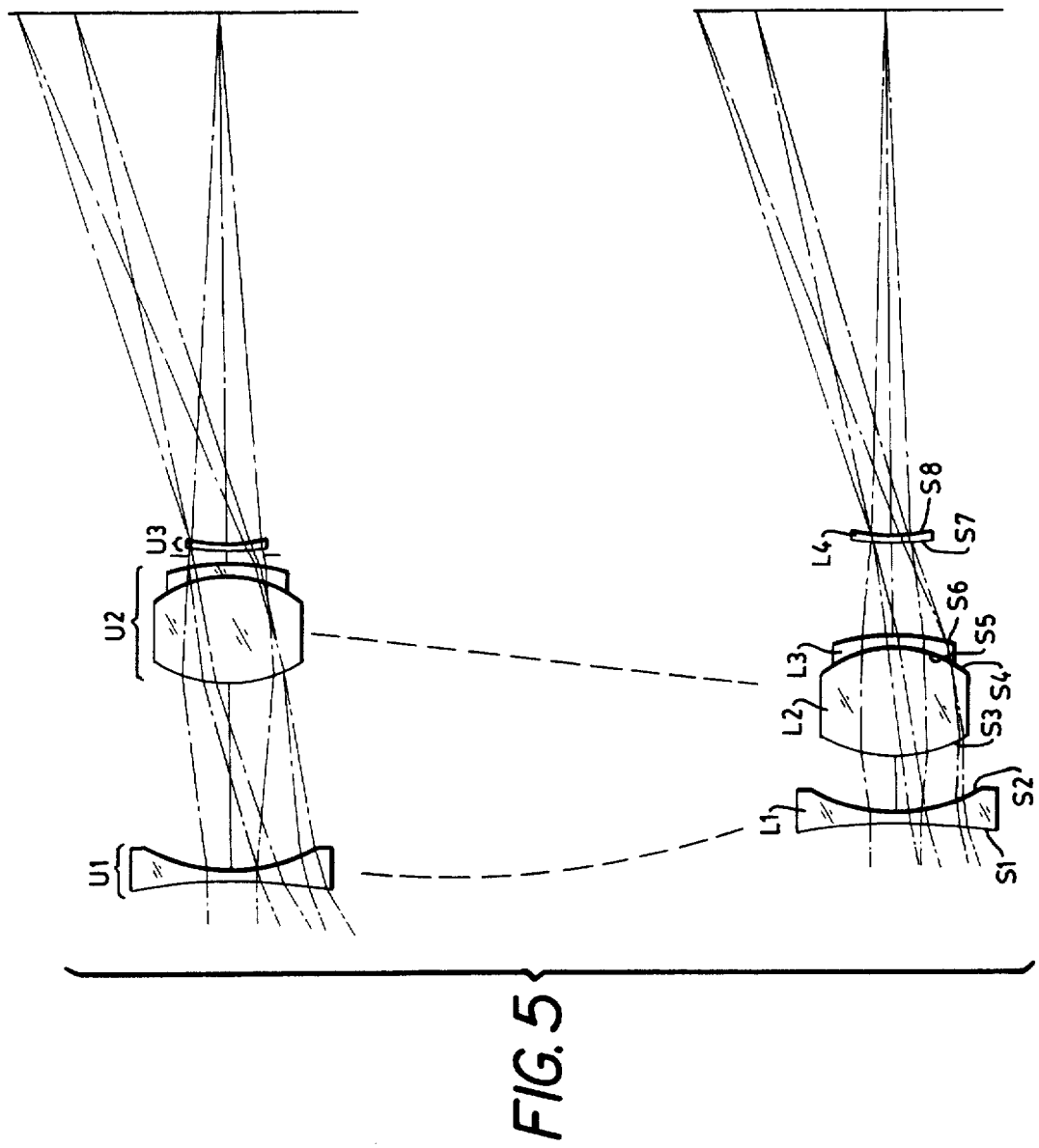
Figure 6:
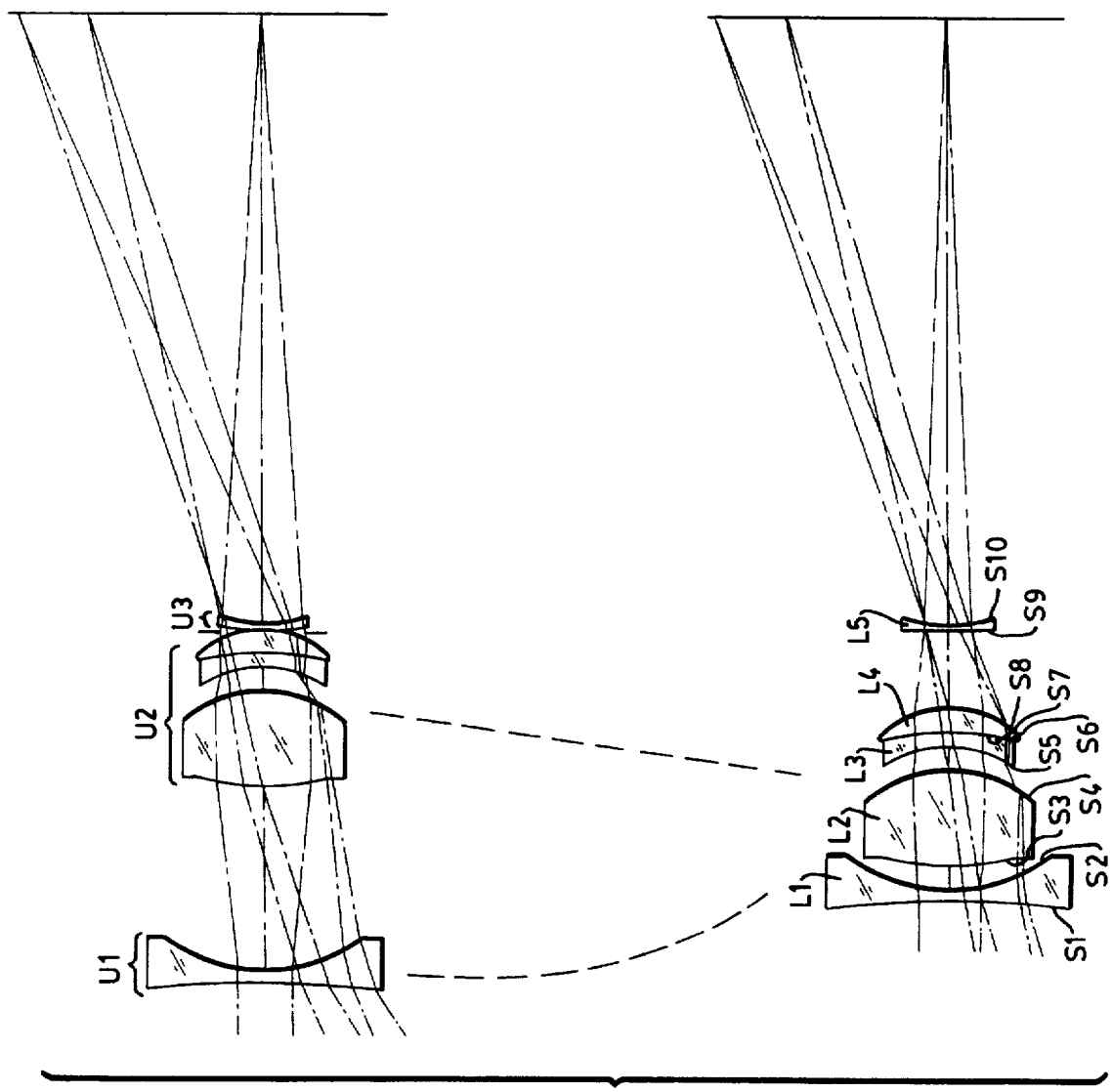
Figure 7:
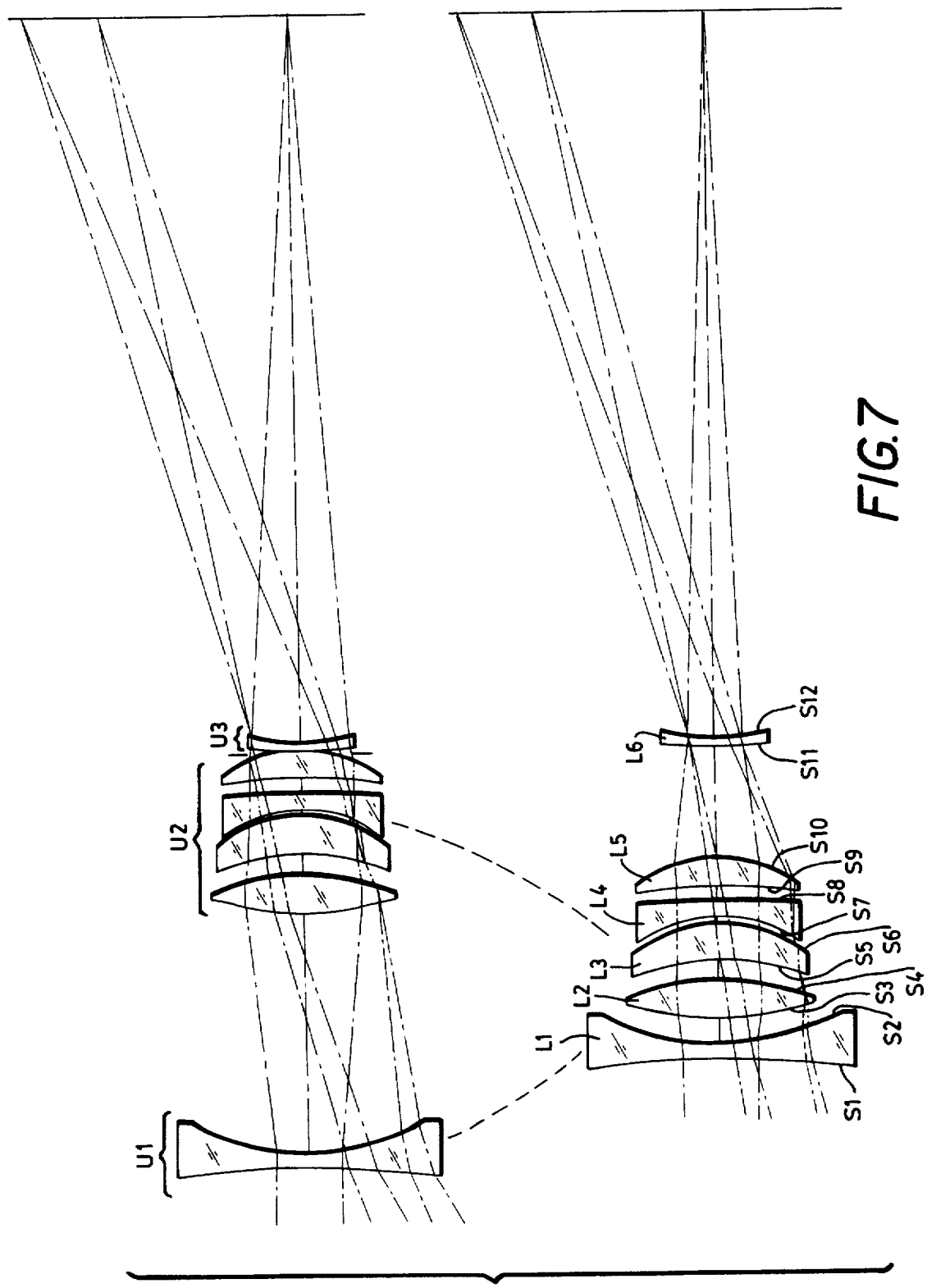
Figure 8:
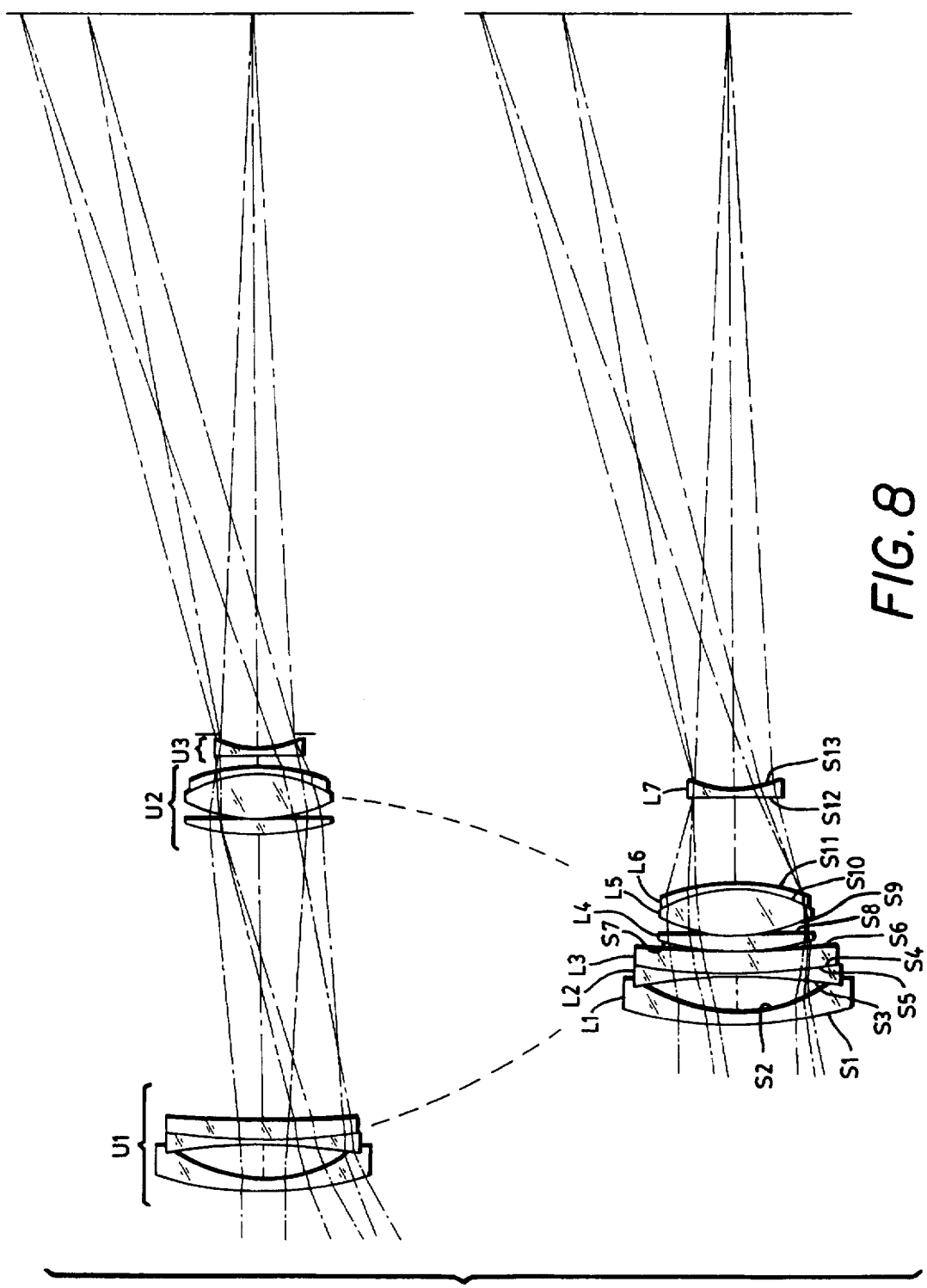
Figure 9:
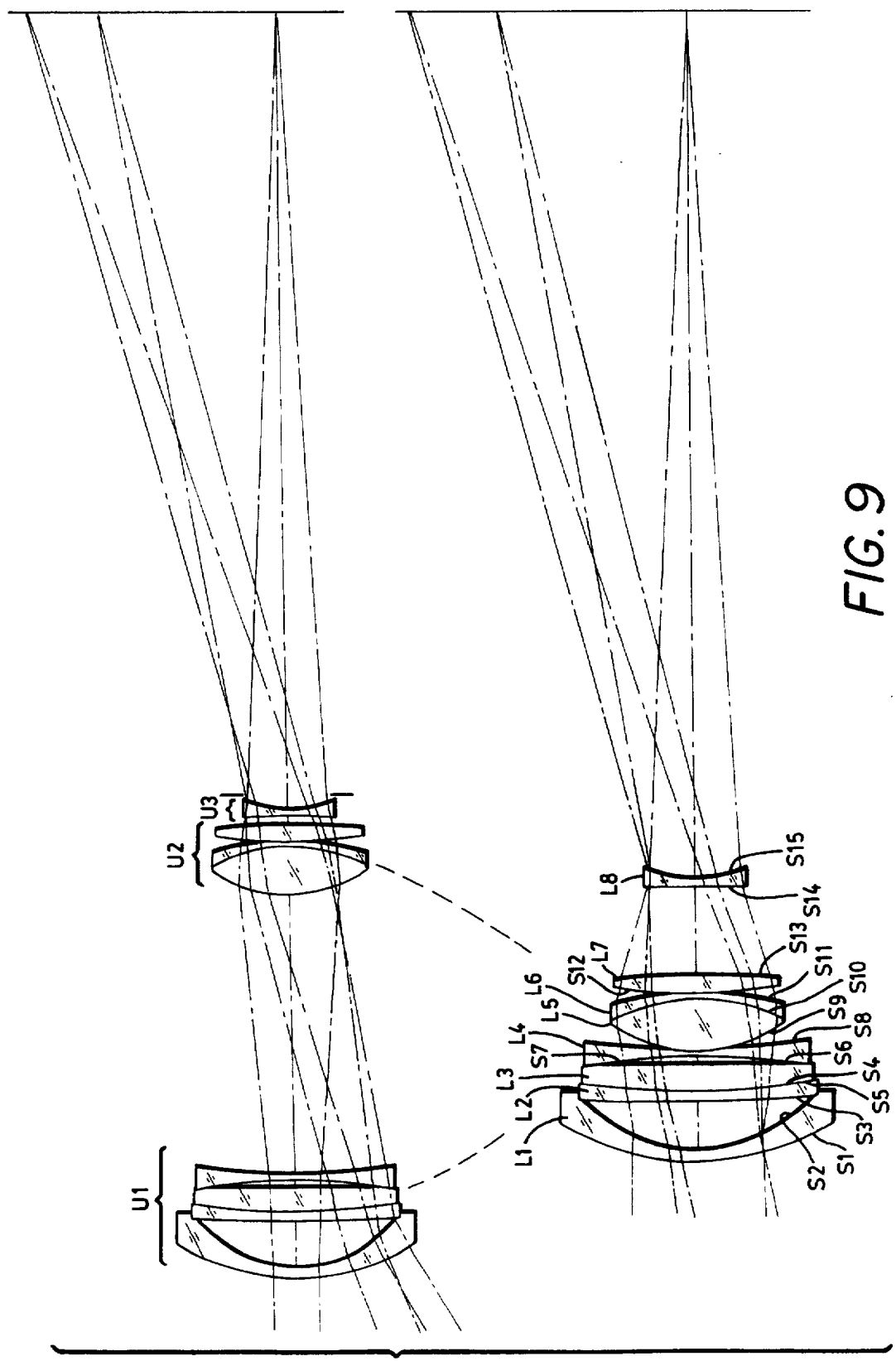
Figure 10:
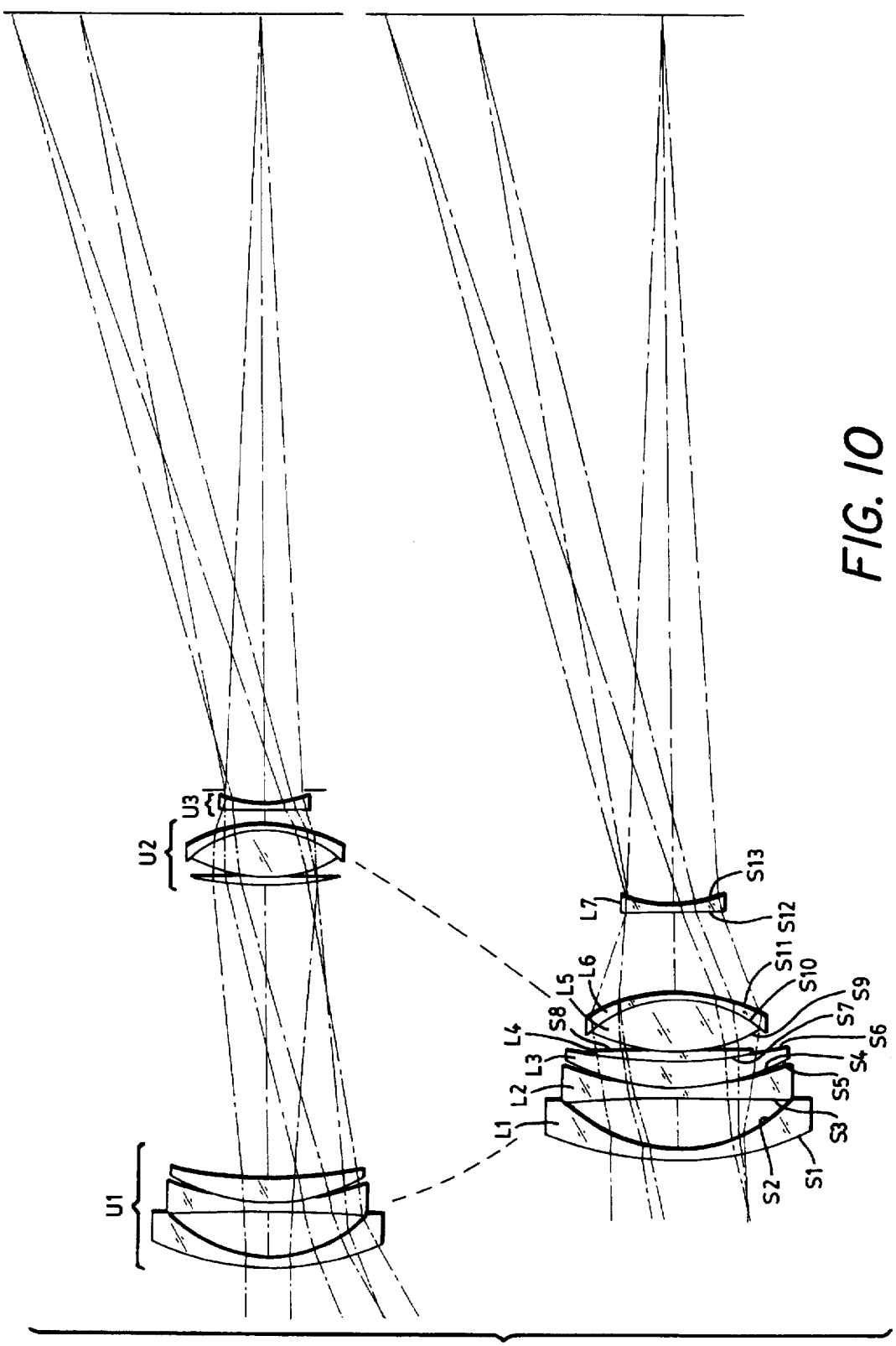

FIGS. 1 to 10 illustrate various lens systems constructed in accordance with the invention and referred to herein as Examples 1 to 10, respectively. Corresponding prescriptions appear in Tables 1 to 10, respectively. Summaries of the various properties of these lens systems are set forth in Tables 11–13.

The glasses and plastics referred to in the prescription tables are set forth in Table 14, where the glass names are the SCHOTF designations. Equivalent glasses made by other manufacturers can be used in the practice of the invention. The aspheric coefficients set forth in the prescription tables are for use in the following equation:

$$z = \frac{cy^2}{1+[1-(1+k)c^2y^2]^{1/2}} + ADy^4 + AEy^6 + AFy^8 + AGy^{10} + AHy^{12} + AIy^{14}$$

where z is the surface sag at a distance y from the optical axis of the system, c is the base curvature of the lens at the optical axis, and k is a conic constant which is zero for the lens systems of FIGS. 1–10 except where noted.

The abbreviations used in the tables are as follows: SN—surface number; CLR. AP.—clear aperture; ZP—zoom position; f/—infinity f-number; EFL—effective focal length; $f_{min}$—minimum effective focal length of the lens system corresponding to the system's wide angle position; $f_{max}$—maximum effective focal length of the lens system; $\Phi_1=1/f_1$, $\Phi_2=1/f_2$, and $\Phi_3=1/f_3$, where $f_1$, $f_2$, and $f_3$ are the focal lengths of the first, second, and third lens units, respectively; $\Phi=\Phi_1+\Phi_2+\Phi_3$; f/$_{min}$—infinity f-number at $f_{min}$; f/$_{max}$—infinity f-number at $f_{max}$; BFL—back focal length; FVD—front vertex to image distance; FVD$_{min}$—minimum front vertex to image distance; PMR—ratio of entrance pupil magnification at $f_{min}$ to entrance pupil magnification at $f_{max}$; FIELD—half angle field of view; and HFOV—half angle field of view at $f_{min}$. Surfaces, lens elements, and lens units are identified by "S", "L" and "U" numbers, respectively, in the figures.

All dimensions given in the tables are in millimeters. Thickness values in the prescription tables represent the distance between the surface with which the thickness value is aligned and the next higher surface number. They thus correspond to either lens thicknesses or lens spacings depending upon the surface number with which the thickness is associated.

Without intending to limit it in any manner, the present invention will be more fully described by the following examples.

EXAMPLES 1 and 2

Examples 1 and 2 illustrate embodiments of the invention employing three elements in which the second element is used to change the system's magnification and either the first element (Example 1) or the third element (Example 2) is used for compensating and focusing. In the Example 2 embodiment, if desired, the first element can be used for focusing, rather than the third element.

EXAMPLE 3

Example 3 illustrates a variation of the lens system of Example 1 wherein the second lens unit includes two positive lens elements. This configuration avoids the thick lens element of Example 1.

EXAMPLES 4 and 5

The lens systems of Examples 4 and 5 employ a compound second lens unit which provides improved color correction. These systems have a somewhat greater focal length range than the systems of Examples 1–3. The system of Example 4 has a constant f/10 relative aperture during zooming, while that of Example 5 varies from f/8 to f/14 as the focal length of the system increases from its minimum to its maximum focal length.

EXAMPLE 6

Example 6 illustrates a lens system having a focal length range on the order of 2:1 and a field of view of more than 60°.

EXAMPLES 7 through 10

Examples 7 through 10 illustrate lens systems having increased $f_{max}$ values achieved through the addition of elements to the second unit in Example 7 and to the first and second units in Examples 8 through 10.

Although preferred and other embodiments of the invention have been described herein, other embodiments will be evident to those skilled in the art without departing from the scope of the invention as defined by the following claims.

TABLE 1

LENS SYSTEM PRESCRIPTION

| SN | RADIUS | THICKNESS | MATERIAL | CLR. AP. |
|---|---|---|---|---|
| 1 | 3304.1212 | 2.50000 | FK5 | 39.58 |
| 2 | 27.9640 | zoom | | 33.63 |
| 3 | 29.4444 | 19.82802 | ACRYLIC | 22.37 |
| 4 | −29.4988 | zoom | | 18.31 |
| 5 | 69.3003 | 1.24499 | SF14 | 12.26 |
| 6 | 27.5475 | | | 12.26 |

ASPHERICAL SURFACE DATA

| SN | AD | AE | AF | AG | AH | AI | k |
|---|---|---|---|---|---|---|---|
| 1 | 2.8963E-06 | −3.7344E-09 | 4.2323E-12 | 2.5231E-15 | −3.0762E-18 | −8.1682E-21 | 0.0 |
| 3 | −6.0912E-06 | −5.4378E-08 | 1.5967E-10 | 9.0665E-14 | −7.7705E-15 | 1.5054E-17 | −1.0 |
| 4 | 9.6052E-06 | −1.6273E-07 | 1.4385E-09 | −3.6565E-12 | −9.5067E-14 | 6.5097E-16 | 0.0 |

ZOOM SPACINGS

| ZP\SN | 2 | 4 | EFL |
|---|---|---|---|
| 1 | 42.151 | 0.300 | 78.0 |
| 2 | 23.239 | 5.576 | 105.0 |
| 3 | 16.417 | 8.497 | 120.0 |

| | SYSTEM FIRST ORDER PROPERTIES, POS 1 | | | |
|---|---|---|---|---|
| FIELD: 30.0° | f/10.00 | EFL: 77.9795 | FVD: 184.968 | BFL: 118.944 |
| | SYSTEM FIRST ORDER PROPERTIES, POS 2 | | | |
| FIELD: 23.0° | f/10.00 | EFL: 104.973 | FVD: 171.333 | BFL: 118.945 |
| | SYSTEM FIRST ORDER PROPERTIES, POS 3 | | | |
| FIELD: 20.0° | f/10.00 | EFL: 119.973 | FVD: 167.436 | BFL: 118.949 |

TABLE 2

LENS SYSTEM PRESCRIPTION

| SN | RADIUS | THICKNESS | MATERIAL | CLR. AP. |
|---|---|---|---|---|
| 1 | 879.6939 | 2.50000 | FK5 | 39.74 |

TABLE 2-continued

| | | | | | |
|---|---|---|---|---|---|
| 2 | 26.2774 | zoom | | 33.52 | |
| 3 | 33.6184 | 18.53512 | ACRYLIC | 22.76 | |
| 4 | −31.4526 | zoom | | 19.69 | |
| 5 | 51.6391 | 1.24499 | SF14 | 13.52 | |
| 6 | 26.2562 | | | 13.14 | |

ASPHERICAL SURFACE DATA

| SN | AD | AE | AF | AG | AH | AI | k |
|---|---|---|---|---|---|---|---|
| 1 | 3.2383E-06 | −5.9305E-09 | 5.5323E-12 | 7.3400E-15 | 7.2597E-19 | −2.7735E-20 | 0.0 |
| 3 | −7.2431E-06 | −4.4641E-08 | 2.0719E-10 | −3.8373E-13 | −1.0862E-14 | 4.6448E-17 | −1.0 |
| 4 | 5.4039E-06 | −1.5831E-07 | 1.6836E-09 | −3.2557E-12 | −9.9817E-14 | 5.6546E-16 | 0.0 |

ZOOM SPACINGS

| ZP\SN | 2 | 4 | EFL |
|---|---|---|---|
| 1 | 42.077 | 3.535 | 78.0 |
| 2 | 27.491 | 7.330 | 104.9 |
| 3 | 21.588 | 9.956 | 119.9 |

SYSTEM FIRST ORDER PROPERTIES, POS 1

FIELD: 30.0°   f/10.00   EFL: 77.9616   FVD: 185.001   BFL: 117.108

SYSTEM FIRST ORDER PROPERTIES, POS 2

FIELD: 23.0°   f/10.00   EFL: 104.936   FVD: 184.922   BFL: 127.980

SYSTEM FIRST ORDER PROPERTIES, POS 3

FIELD: 20.0°   f/10.00   EFL: 119.925   FVD: 184.978   BFL: 131.154

TABLE 3

LENS SYSTEM PRESCRIPTION

| SN | RADIUS | THICKNESS | MATERIAL | CLR. AP. |
|---|---|---|---|---|
| 1 | −103.8660 | 2.26500 | 494527 | 39.70 |
| 2 | 42.0302 | zoom | | 34.70 |
| 3 | 23.1953 | 6.00000 | ACRYLIC | 26.19 |
| 4 | 175.1887 | 7.42601 | | 24.97 |
| 5 | −197.0454 | 6.00000 | ACRYLIC | 21.75 |
| 6 | −24.8371 | zoom | | 20.57 |
| 7 | 246.3657 | 1.12796 | 769272 | 9.96 |
| 8 | 40.7847 | | | 10.27 |

ASPHERICAL SURFACE DATA

| SN | AD | AE | AF | AG | AH | AI | k |
|---|---|---|---|---|---|---|---|
| 1 | 5.9157E-06 | −6.0045E-09 | 4.9235E-12 | 3.0532E-15 | −3.1568E-18 | −1.0484E-20 | 0.0 |
| 3 | −4.9716E-06 | −3.5214E-08 | −1.1278E-10 | 4.2662E-13 | 2.2850E-15 | −1.5653E-17 | −1.0 |
| 6 | 2.2366E-05 | −2.0536E-07 | 2.4019E-09 | −4.5486E-12 | −1.8443E-13 | 1.0407E-15 | 0.0 |

ZOOM SPACINGS

| ZP\SN | 2 | 6 | EFL |
|---|---|---|---|
| 1 | 27.902 | 0.191 | 75.0 |
| 2 | 14.133 | 4.518 | 95.2 |
| 3 | 1.930 | 10.912 | 125.0 |

SYSTEM FIRST ORDER PROPERTIES, POS 1

FIELD: 32.0°   f/10.00   EFL: 75.0204   FVD: 146.290   BFL: 95.3778

SYSTEM FIRST ORDER PROPERTIES, POS 2

FIELD: 23.0°   f/10.00   EFL: 95.2262   FVD: 136.847   BFL: 95.3769

SYSTEM FIRST ORDER PROPERTIES, POS 3

FIELD: 19.0°   f/10.00   EFL: 125.036   FVD: 131.042   BFL: 95.3809

TABLE 4

LENS SYSTEM PRESCRIPTION

| SN | RADIUS | THICKNESS | MATERIAL | CLR. AP. |
|----|--------|-----------|----------|----------|
| 1 | −90.6780 | 2.50000 | FK5 | 42.84 |
| 2 | 41.1559 | zoom | | 37.75 |
| 3 | 26.5909 | 24.05444 | ACRYLIC | 32.19 |
| 4 | −22.8423 | 0.05000 | | 30.19 |
| 5 | −27.7884 | 2.99731 | SF6 | 27.44 |
| 6 | −42.6129 | zoom | | 27.17 |
| 7 | 117.7337 | 1.24499 | LAF7 | 14.08 |
| 8 | 33.7431 | | | |

ASPHERICAL SURFACE DATA

| SN | AD | AE | AF | AG | AH | AI | k |
|----|-----|-----|-----|-----|-----|-----|---|
| 1 | 5.5697E-06 | −1.2045E-08 | 2.3217E-11 | −3.4428E-16 | −7.4003E-17 | 7.9976E-20 | 0.0 |
| 3 | −7.7342E-06 | −4.6162E-09 | −7.8872E-11 | 2.7589E-14 | 2.3366E-15 | −8.9471E-18 | 0.0 |
| 4 | 4.1044E-06 | −3.7268E-08 | 7.6259E-11 | −3.5244E-14 | −2.2513E-15 | 6.2032E-18 | −1.0 |

ZOOM SPACINGS

| ZP\SN | 2 | 6 | EFL |
|-------|-----|-----|-----|
| 1 | 46.564 | 2.626 | 87.0 |
| 2 | 24.115 | 10.989 | 124.4 |
| 3 | 12.493 | 18.945 | 160.0 |

SYSTEM FIRST ORDER PROPERTIES, POS 1

FIELD: 28.7°   f/10.00   EFL: 87.0056   FVD: 204.008   BFL: 123.972

SYSTEM FIRST ORDER PROPERTIES, POS 2

FIELD: 20.0°   f/10.00   EFL: 124.409   FVD: 189.924   BFL: 123.973

SYSTEM FIRST ORDER PROPERTIES, POS 3

FIELD: 14.5°   f/10.00   EFL: 160.014   FVD: 186.260   BFL: 123.975

TABLE 5

LENS SYSTEM PRESCRIPTION

| SN | RADIUS | THICKNESS | MATERIAL | CLR. AP. |
|----|--------|-----------|----------|----------|
| 1 | −86.6143 | 2.50000 | FK5 | 43.00 |
| 2 | 37.9708 | zoom | | 37.65 |
| 3 | 26.8378 | 24.61778 | ACRYLIC | 30.74 |
| 4 | −22.8222 | 0.10000 | | 26.49 |
| 5 | −27.8741 | 2.99731 | SF6 | 24.87 |
| 6 | −44.0898 | zoom | | 24.44 |
| 7 | 85.1771 | 1.24499 | LAF7 | 17.12 |
| 8 | 31.8936 | | | 17.06 |

ASPHERICAL SURFACE DATA

| SN | AD | AE | AF | AG | AH | AI | k |
|----|-----|-----|-----|-----|-----|-----|---|
| 1 | 6.0043E-06 | −1.2203E-08 | 2.3691E-11 | −6.6761E-16 | −7.7958E-17 | 8.4597E-20 | 0.0 |
| 3 | −7.4588E-06 | −2.4378E-09 | −8.4643E-11 | 5.8913E-15 | 2.3318E-15 | −8.5728E-18 | 0.0 |
| 4 | 3.6131E-06 | −3.5276E-08 | 6-8102E-11 | −8.9469E-14 | −2.2129E-15 | 7.6557E-18 | −1.0 |

ZOOM SPACINGS

| ZP\SN | 2 | 6 | EFL |
|-------|-----|-----|-----|
| 1 | 44.413 | 3.481 | 87.0 |
| 2 | 24.047 | 13.104 | 124.4 |
| 3 | 13.504 | 22.259 | 160.0 |

TABLE 5-continued

SYSTEM FIRST ORDER PROPERTIES, POS 1

| | | | | |
|---|---|---|---|---|
| FIELD: 28.7° | f/8.00 | EFL: 86.9996 | FVD: 203.999 | BFL: 124.644 |

SYSTEM FIRST ORDER PROPERTIES, POS 2

| | | | | |
|---|---|---|---|---|
| FIELD: 20.0° | f/10.00 | EFL: 124.401 | FVD: 193.258 | BFL: 124.647 |

SYSTEM FIRST ORDER PROPERTIES, POS 3

| | | | | |
|---|---|---|---|---|
| FIELD: 14.5° | f/14.00 | EFL: 160.004 | FVD: 191.872 | BFL: 124.650 |

TABLE 6

LENS SYSTEM PRESCRIPTION

| SN | RADIUS | THICKNESS | MATERIAL | CLR. AP. |
|---|---|---|---|---|
| 1 | −102.1942 | 2.25000 | FK5 | 41.26 |
| 2 | 30.5801 | zoom | | 35.21 |
| 3 | 36.8083 | 17.79691 | ACRYLIC | 27.81 |
| 4 | −20.8846 | 4.78050 | | 27.62 |
| 5 | −19.0006 | 2.69758 | SF1 | 20.60 |
| 6 | −50.7864 | 0.09000 | | 21.22 |
| 7 | −122.7282 | 4.38399 | ACRYLIC | 21.21 |
| 8 | −18.6433 | zoom | | 21.66 |
| 9 | 99.5783 | 1.12049 | LAK21 | 15.51 |
| 10 | 24.7527 | | | 15.48 |

ASPHERICAL SURFACE DATA

| SN | AD | AE | AF | AG | AH | AI | k |
|---|---|---|---|---|---|---|---|
| 1 | 7.3493E-06 | −1.9966E-08 | 4.8102E-11 | 5.6056E-15 | −2.5309E-16 | 3.0932E-19 | 0.0 |
| 3 | −1.7524E-05 | −2.7058E-08 | −1.5959E-10 | 1.5065E-13 | −5.6647E-16 | −1.1933E-17 | 0.0 |
| 4 | −2.0584E-06 | −2.0890E-08 | −4.4171E-11 | −2.0239E-13 | −6.8139E-16 | 4.3780E-18 | −1.0 |
| 7 | −1.9145E-05 | −1.0011E-07 | 2.8882E-10 | −2.4453E-12 | −4.9412E-14 | −3.9265E-16 | 0.0 |
| 8 | −1.5868E-05 | −2.3140E-08 | −4.7459E-10 | 1.8169E-12 | −8.6775E-15 | −4.4529E-16 | 0.0 |

ZOOM SPACINGS

| ZP\SN | 2 | 6 | EFL |
|---|---|---|---|
| 1 | 35.376 | 0.016 | 78.0 |
| 2 | 15.339 | 7.402 | 112.0 |
| 3 | 4.443 | 14.944 | 148.1 |

SYSTEM FIRST ORDER PROPERTIES, POS 1

| | | | | |
|---|---|---|---|---|
| FIELD: 31.0° | f/8.00 | EFL: 78.0157 | FVD: 183.625 | BFL: 115.113 |

SYSTEM FIRST ORDER PROPERTIES, POS 2

| | | | | |
|---|---|---|---|---|
| FIELD: 21.5° | f/10.00 | EFL: 112.037 | FVD: 170.991 | BFL: 115.131 |

SYSTEM FIRST ORDER PROPERTIES, POS 3

| | | | | |
|---|---|---|---|---|
| FIELD: 15.0° | f/14.00 | EFL: 148.092 | FVD: 167.675 | BFL: 115.168 |

TABLE 7

LENS SYSTEM PRESCRIPTION

| SN | RADIUS | THICKNESS | MATERIAL | CLR. AP. |
|---|---|---|---|---|
| 1 | −109.0711 | 2.50000 | BK7 | 42.68 |
| 2 | 38.6965 | zoom | | 37.67 |
| 3 | 35.0238 | 6.64671 | ACRYLIC | 30.07 |
| 4 | −39.3508 | 3.97927 | | 29.87 |
| 5 | −37.6384 | 6.65000 | ACRYLIC | 27.33 |
| 6 | −20.1876 | 1.09379 | | 27.15 |
| 7 | −21.9180 | 2.99731 | 645346 | 24.98 |
| 8 | −144.6422 | 2.58450 | | 25.31 |
| 9 | −121.9281 | 4.87110 | ACRYLIC | 25.25 |
| 10 | −21.8807 | zoom | | 25.32 |
| 11 | 104.9711 | 1.24499 | 748402 | 17.17 |
| 12 | 31.4413 | | | |

TABLE 7-continued

ASPHERICAL SURFACE DATA

| SN | AD | AE | AF | AG | AH | AI | k |
|---|---|---|---|---|---|---|---|
| 1 | 4.0293E-06 | -6.6558E-09 | 1.0255E-11 | 1.9775E-15 | -3.4542E-17 | 3.2103E-20 | 0.0 |
| 3 | -1.0308E-05 | -1.3218E-08 | -7.6350E-11 | 6.5145E-14 | 1.4877E-15 | -7.0070E-18 | 0.0 |
| 6 | -2.3701E-06 | -7.6668E-09 | -8.1017E-12 | 1.8288E-15 | -1.0832E-16 | -2.4292E-18 | -1.0 |
| 9 | -1.6883E-05 | 2.2446E-09 | 1.0884E-11 | 4.2466E-13 | 4.4431E-15 | 1.2455E-17 | 0.0 |
| 10 | -1.1815E-05 | 1.3151E-08 | -6.4491E-11 | 2.7035E-13 | 3.0739E-15 | 1.7923E-17 | 0.0 |

ZOOM SPACINGS

| ZP\SN | 2 | 4 | EFL |
|---|---|---|---|
| 1 | 42.741 | 0.018 | 87.0 |
| 2 | 20.114 | 8.465 | 124.4 |
| 3 | 4.937 | 19.854 | 176.8 |

SYSTEM FIRST ORDER PROPERTIES, POS 1

FIELD: 28.7°  f/8.00  EFL: 87.0036  FVD: 204.007  BFL: 128.680

SYSTEM FIRST ORDER PROPERTIES, POS 2

FIELD: 20.0°  f/10.00  EFL: 124.446  FVD: 189.828  BFL: 128.682

SYSTEM FIRST ORDER PROPERTIES, POS 3

FIELD: 13.0°  f/14.00  EFL: 176.782  FVD: 186.041  BFL: 128.683

TABLE 8

LENS SYSTEM PRESCRIPTION

| SN | RADIUS | THICKNESS | MATERIAL | CLR. AP. |
|---|---|---|---|---|
| 1 | 78.1313 | 2.07373 | LAK9 | 41.23 |
| 2 | 30.0012 | 7.26503 | | 36.61 |
| 3 | -111.9979 | 1.03687 | ACRYLIC | 36.76 |
| 4 | 143.9730 | 0.00000 | | 36.44 |
| 5 | 111.3747 | 4.00000 | SF6 | 36.44 |
| 6 | 275.4295 | zoom | | 35.87 |
| 7 | 43.2028 | 3.11060 | ACRYLIC | 28.74 |
| 8 | -2163.1731 | 0.00000 | | 28.53 |
| 9 | 31.1591 | 9.33179 | FK5 | 27.40 |
| 10 | -26.5027 | 1.03687 | SF57 | 26.19 |
| 11 | -37.4162 | zoom | | 26.35 |
| 12 | -147.4270 | 1.24499 | FK5 | 17.02 |
| 13 | 19.8176 | | | 16.88 |

ASPHERICAL SURFACE DATA

| SN | AD | AE | AF | AG | AH | AI | k |
|---|---|---|---|---|---|---|---|
| 4 | -8.7926E-07 | 2.4773E-09 | -8.3346E-12 | -4.9026E-15 | 4.8379E-17 | -4.0489E-20 | 0.0 |
| 7 | -6.4937E-06 | 3.1109E-09 | -7.4365E-11 | 8.8832E-14 | 1.5862E-15 | -5.3996E-18 | 0.0 |

ZOOM SPACINGS

| ZP\SN | 6 | 11 | EFL |
|---|---|---|---|
| 1 | 60.188 | 2.738 | 87.0 |
| 2 | 32.791 | 5.967 | 124.2 |
| 3 | 9.477 | 11.998 | 185.9 |
| 4 | 0.172 | 16.723 | 223.5 |

SYSTEM FIRST ORDER PROPERTIES, POS 1

FIELD: 28.7°  f/10.00  EFL: 86.9646  FVD: 244.408  BFL: 152.442

SYSTEM FIRST ORDER PROPERTIES, POS 2

FIELD: 20.0°  f/10.00  EFL: 124.220  FVD: 220.099  BFL: 152.241

SYSTEM FIRST ORDER PROPERTIES, POS 3

FIELD: 13.0°  f/10.00  EFL: 185.864  FVD: 202.397  BFL: 151.822

SYSTEM FIRST ORDER PROPERTIES, POS 4

FIELD: 11.0°  f/10.00  EFL: 223.549  FVD: 197.540  BFL: 151.545

TABLE 9

LENS SYSTEM PRESCRIPTION

| SN | RADIUS | THICKNESS | MATERIAL | CLR. AP. |
|---|---|---|---|---|
| 1 | 40.5401 | 2.00000 | LAK9 | 42.08 |
| 2 | 23.3550 | 8.45088 | | 36.44 |
| 3 | 367.7721 | 2.00000 | SK5 | 36.37 |
| 4 | 139.7349 | 0.01330 | | 35.47 |
| 5 | 104.7151 | 4.33358 | 812267 | 35.32 |
| 6 | 3313.9972 | 1.61359 | | 34.27 |
| 7 | −88.4707 | 1.00000 | ACRYLIC | 34.34 |
| 8 | 87.0517 | zoom | | 33.19 |
| 9 | 23.8377 | 9.00000 | FK5 | 26.21 |
| 10 | −27.7117 | 1.00000 | 818246 | 25.94 |
| 11 | −45.3598 | 0.00000 | | 26.11 |
| 12 | 57.3203 | 3.00000 | ACRYLIC | 25.01 |
| 13 | −179.9489 | zoom | | 24.52 |
| 14 | −109.1347 | 1.20072 | 466785 | 16.01 |
| 15 | 20.1359 | | | 15.28 |

ASPHERICAL SURFACE DATA

| SN | AD | AE | AF | AG | AH | AI | k |
|---|---|---|---|---|---|---|---|
| 8 | −4.3960E-06 | 8.5580E-09 | −5.7343E-11 | 3.9639E-14 | 3.7415E-16 | −6.1515E-19 | 0.0 |
| 12 | −1.2049E-05 | −2.2237E-08 | 1.5713E-10 | −6.1636E-13 | −8.1341E-15 | 4.1693E-17 | −1.0 |

ZOOM SPACINGS

| ZP\SN | 2 | 6 | EFL |
|---|---|---|---|
| 1 | 53.567 | 1.821 | 84.0 |
| 2 | 28.675 | 5.277 | 119.9 |
| 3 | 7.830 | 11.616 | 179.9 |
| 4 | 0.166 | 16.011 | 217.0 |

SYSTEM FIRST ORDER PROPERTIES, POS 1

FIELD: 29.3°   f/10.00   EFL: 83.9520   FVD: 238.913   BFL: 149.913

SYSTEM FIRST ORDER PROPERTIES, POS 2

FIELD: 20.0°   f/10.00   EFL: 119.924   FVD: 217.468   BFL: 149.904

SYSTEM FIRST ORDER PROPERTIES, POS 3

FIELD: 13.0°   f/10.00   EFL: 179.928   FVD: 202.998   BFL: 149.941

SYSTEM FIRST ORDER PROPERTIES, POS 4

FIELD: 11.0°   f/10.00   EFL: 217.038   FVD: 199.822   BFL: 150.033

TABLE 10

LENS SYSTEM PRESCRIPTION

| SN | RADIUS | THICKNESS | MATERIAL | CLR. AP. |
|---|---|---|---|---|
| 1 | 51.6505 | 2.00000 | LAK9 | 40.59 |
| 2 | 24.9630 | 8.45088 | | 35.36 |
| 3 | −273.0997 | 2.00000 | SK5 | 35.11 |
| 4 | 48.1838 | 0.01338 | | 33.80 |
| 5 | 36.2373 | 4.33358 | 633365 | 33.87 |
| 6 | 77.9128 | zoom | | 33.18 |
| 7 | 49.9913 | 1.50000 | ACRYLIC | 25.41 |
| 8 | −1491.0411 | 0.00000 | | 25.50 |
| 9 | 27.8996 | 9.00000 | FK5 | 26.87 |
| 10 | −19.9804 | 1.00000 | 765268 | 26.82 |
| 11 | −26.9290 | zoom | | 27.27 |
| 12 | −301.1807 | 1.20072 | 657572 | 16.27 |
| 13 | 20.2215 | | | 15.58 |

TABLE 10-continued

ASPHERICAL SURFACE DATA

| SN | AD | AE | AF | AG | AH | AI | k |
|----|----|----|----|----|----|----|---|
| 7 | −1.3501E-05 | −3.6849E-08 | 1.4171E-10 | −1.1897E-13 | −5.5400E-15 | 1.3771E-17 | −2.0 |

ZOOM SPACINGS

| ZP\SN | 6 | 11 | EFL |
|-------|---|----|-----|
| 1 | 56.512 | 2.980 | 84.0 |
| 2 | 30.802 | 5.516 | 120.0 |
| 3 | 8.902 | 10.179 | 180.0 |
| 4 | 0.166 | 13.774 | 217.0 |

SYSTEM FIRST ORDER PROPERTIES, POS 1

FIELD: 29.3°   f/10.00   EFL: 84.0001   FVD: 239.000   BFL: 150.010

SYSTEM FIRST ORDER PROPERTIES, POS 2

FIELD: 20.0°   f/10.00   EFL: 120.001   FVD: 215.828   BFL: 150.011

SYSTEM FIRST ORDER PROPERTIES, POS 3

FIELD: 13.0°   f/10.00   EFL: 180.007   FVD: 198.595   BFL: 150.016

SYSTEM FIRST ORDER PROPERTIES, POS 4

FIELD: 11.0°   f/10.00   EFL: 217.017   FVD: 193.461   BFL: 150.022

TABLE 11

| Example | $f_{min}$ | $f_{max}$ | $\Phi_1$ | $\Phi_2$ | $\Phi_3$ | $FVD_{min}$ | BFL | PMR |
|---------|-----------|-----------|----------|----------|----------|-------------|-----|-----|
| 1 | 78 | 120 | −.0173 | .0297 | −.0166 | 167 | 119 | 1.54 |
| 2 | 78 | 120 | −.0180 | .0275 | −.0141 | 185 | 117–131 | 1.37 |
| 3 | 75 | 125 | −.0166 | .0308 | −.0157 | 131 | 95 | 1.66 |
| 4 | 87 | 160 | −.0174 | .0262 | −.0159 | 186 | 124 | 1.84 |
| 5 | 87 | 160 | −.0186 | .0265 | −.0147 | 192 | 125 | 1.84 |
| 6 | 78 | 148 | −.0209 | .0308 | −.0194 | 168 | 115 | 1.92 |
| 7 | 87 | 177 | −.0182 | .0268 | −.0165 | 186 | 129 | 2.05 |
| 8 | 87 | 224 | −.0179 | .0341 | −.0281 | 198 | 152 | 2.06 |
| 9 | 84 | 217 | −.0193 | .0355 | −.0275 | 200 | 150 | 2.57 |
| 10 | 84 | 217 | −.0198 | .0393 | −.0347 | 193 | 150 | 2.54 |

TABLE 12

| Example | $\Phi$ | $|f_1|/f_{min}$ | $|f_3|/f_{min}$ | $BFL/f_{min}$ | $(|\Phi_1| + |\Phi_3|)/\Phi_2$ | $f_2/f_{max}$ |
|---------|--------|-----------------|-----------------|---------------|--------------------------------|---------------|
| 1 | −.004 | 0.74 | 0.77 | 1.53 | 1.14 | 0.28 |
| 2 | −.005 | 0.71 | 0.91 | 1.50–1.68 | 1.17 | 0.30 |
| 3 | −.002 | 0.80 | 0.85 | 1.27 | 1.05 | 0.26 |
| 4 | −.007 | 0.66 | 0.72 | 1.43 | 1.27 | 0.24 |
| 5 | −.007 | 0.62 | 0.78 | 1.44 | 1.26 | 0.24 |
| 6 | −.010 | 0.61 | 0.66 | 1.47 | 1.31 | 0.22 |
| 7 | −.008 | 0.63 | 0.70 | 1.48 | 1.29 | 0.21 |
| 8 | −.012 | 0.64 | 0.41 | 1.75 | 1.35 | 0.13 |
| 9 | −.011 | 0.62 | 0.43 | 1.79 | 1.32 | 0.13 |
| 10 | −.015 | 0.60 | 0.34 | 1.79 | 1.39 | 0.12 |

TABLE 13

| Example | $f/_{min}$ | $f/_{max}$ | HFOV |
|---------|-----------|-----------|------|
| 1 | 10 | 10 | 30° |
| 2 | 10 | 10 | 30° |
| 3 | 10 | 10 | 32° |
| 4 | 10 | 10 | 29° |
| 5 | 8 | 14 | 29° |
| 6 | 8 | 14 | 31° |
| 7 | 8 | 14 | 29° |
| 8 | 10 | 10 | 29° |
| 9 | 10 | 10 | 29° |
| 10 | 10 | 10 | 29° |

TABLE 14

| Material | $N_e$ | $V_e$ |
|----------|-------|-------|
| FK5 | 1.489142 | 70.2 |
| ACRYLIC | 1.493538 | 57.3 |
| SF14 | 1.768587 | 26.3 |
| 494527 | 1.493538 | 52.7 |
| 769272 | 1.768587 | 27.2 |
| SF6 | 1.812647 | 25.2 |
| LAF7 | 1.754580 | 34.7 |
| SF1 | 1.723102 | 29.3 |
| LAK21 | 1.643036 | 59.9 |
| BK7 | 1.518720 | 64.0 |
| 645346 | 1.644907 | 34.6 |

TABLE 14-continued

| Material | $N_e$ | $V_e$ |
|---|---|---|
| 748402 | 1.747949 | 40.2 |
| LAK9 | 1.694011 | 54.5 |
| SF57 | 1.855032 | 23.7 |
| SK5 | 1.591422 | 61.0 |
| 812267 | 1.811503 | 26.7 |
| 818246 | 1.818330 | 24.6 |
| 466785 | 1.465539 | 78.5 |
| 633365 | 1.633423 | 36.5 |
| 765268 | 1.765396 | 26.8 |
| 657572 | 1.657255 | 57.2 |

What is claimed is:

1. A zoom lens system for forming an image, said system comprising:

(a) a first lens unit having a negative optical power;

(b) a second lens unit which is on the image side of said first lens unit and has a positive optical power;

(c) a third lens unit which is on the image side of said second lens unit and has a negative optical power; and (d) an aperture stop which is on the image side of said second lens unit;

wherein:

said second lens unit is moveable to change the magnification of the lens system;

said first lens unit is moveable to focus the lens system and to compensate for changes in focus resulting from movement of said second lens unit; and said aperture stop is fixed during zooming of the lens system.

2. A zoom lens system for forming an image, said system comprising:

(a) a first lens unit having a negative optical power;

(b) a second lens unit which is on the image side of said first lens unit and has a positive optical power;

(c) a third lens unit which is on the image side of said second lens unit and has a negative optical power; and (d) an aperture stop which is on the image side of said second lens unit;

wherein:

said second lens unit is moveable to change the magnification of the lens system;

said third lens unit is moveable to focus the lens system and to compensate for changes in focus resulting from movement of said second lens unit; and said aperture stop is fixed during zooming of the lens system.

3. A zoom lens system for forming an image, said system comprising:

(a) a first lens unit having a negative optical power;

(b) a second lens unit which is on the image side of said first lens unit and has a positive optical power;

(c) a third lens unit which is on the image side of said second lens unit and has a negative optical power; and (d) an aperture stop which is on the image side of said second lens unit;

wherein:

said first lens unit is moveable to focus the lens system;

said second lens unit is moveable to change the magnification of the lens system;

said third lens unit is moveable to compensate for changes in focus resulting from movement of said second lens unit; and the aperture stop is fixed during zooming of the lens system.

4. A zoom lens system for forming an image, said system comprising:

(a) a first lens unit having a negative optical power whose absolute value is $|\Phi_1|$;

(b) a second lens unit which is on the image side of said first lens unit, said second lens unit having a positive optical power $\Phi_2$; and (c) a third lens unit which is on the image side of said second lens unit, said third lens unit having a negative optical power whose absolute value is $|\Phi_3|$;

wherein:

said second lens unit is moveable to change the magnification of the lens system; and the ratio of $(|\Phi_1|+|\Phi_3|)/\Phi_2$ is between about 1.0 and about 1.5.

5. A zoom lens system for forming an image, said system having a maximum effective focal length $f_{max}$ and comprising:

(a) a first lens unit having a negative optical power;

(b) a second lens unit which is on the image side of said first lens unit, said second lens unit having a positive optical power and a focal length $f_2$; and (c) a third lens unit which is on the image side of said second lens unit and has a negative optical power;

wherein:

said second lens unit is moveable to change the magnification of the lens system; and the ratio of $f_2/f_{max}$ is between about 0.10 and about 0.35.

6. A zoom lens system for forming an image, said system having a maximum effective focal length $f_{max}$ and a minimum effective focal length $f_{min}$, said system comprising:

(a) a first lens unit having a negative optical power;

(b) a second lens unit which is on the image side of said first lens unit and has a positive optical power;

(c) a third lens unit which is on the image side of said second lens unit and has a negative optical power; and (d) an aperture stop which is on the image side of said second lens unit;

wherein:

said second lens unit is moveable to change the magnification of the lens system; and the ratio of the magnification of tile aperture stop by said first and second lens units at $f_{min}$ to the magnification of the aperture stop by said first and second lens units at $f_{max}$ is less than about 2.0.

7. A zoom lens system for forming an image, said system comprising:

(a) a first lens unit having a negative optical power;

(b) a second lens unit which is on the image side of said first lens unit and has a positive optical power;

(c) a third single lens unit consisting of a single lens element which is on the image side of said second lens unit and has a negative optical power; and (d) an aperture stop which is on the image side of said second lens unit;

wherein:

said second lens unit is moveable to change the magnification of the lens system;

said first lens unit is moveable to focus the lens system and to compensate for changes in focus resulting from movement of said second lens unit; and said aperture stop is fixed during zooming of the lens system.-Please 8. A zoom lens system for forming an image, said system comprising:
(a) a first lens unit having a negative optical power;
(b) a second lens unit which is on the image side of said first lens unit and has a positive optical power;
(c) a third lens unit consisting of a single lens element which is on the image side of said second lens unit and has a negative optical power; and
(d) an aperture stop which is on the image side of said second lens unit;

wherein:
said second lens unit is moveable to change the magnification of the lens system;
said third lens unit is moveable to focus the lens system and to compensate for changes in focus resulting from movement of said second lens unit; and
said aperture stop is fixed during zooming of the lens system.

9. A zoom lens system for forming an image, said system comprising:
(a) a first lens unit having a negative optical power;
(b) a second lens unit which is on the image side of said first lens unit and has a positive optical power;
(c) a third lens unit consisting of a single lens element which is on the image side of said second lens unit and has a negative optical power; and
(d) an aperture stop which is on the image side of said second lens unit;

wherein:
said first lens unit is moveable to focus the lens system;
said second lens unit is moveable to change the magnification of the lens system;
said third lens unit is moveable to compensate for changes in focus resulting from movement of said second lens unit; and
the aperture stop is fixed during zooming of the lens system.

10. The zoom lens system of claim 7, 8, or 9 wherein the index of refraction of said single lens element is higher than the index of refraction of any other lens element in the lens system.

11. The zoom lens system of claim 10 wherein the index of refraction of said single lens element is greater than about 1.6.

12. The zoom lens system of claim 7, 8, or 9 wherein said first lens unit is a single lens element.

13. The zoom lens system of claim 12 wherein said single lens element has at least one aspheric surface.

14. The zoom lens system of claim 12 wherein said single lens element has an Abbe value above about 55.

15. The zoom lens system of claim 7, 8, or 9 wherein said second lens unit comprises only positive lens elements.

16. The zoom lens system of claim 7, 8, or 9 wherein said first, second, and third lens units are each a single lens element.

17. The zoom lens system of claim 7, 8, or 9 wherein said first lens unit is a single lens element, said second lens unit is two positive lens elements, and said third lens unit is a single lens element.

18. The zoom lens system of claim 7, 8, or 9 wherein the lens system has a maximum effective focal length $f_{max}$ and a minimum effective focal length $f_{min}$ and the size of the aperture stop is adjustable to increase the effective aperture of the lens system as the effective focal length of the lens system decreases from $f_{max}$ to $f_{min}$.

19. The zoom lens system of claim 7, 8, or 9 wherein the lens system has a minimum effective focal length $f_{min}$, said first lens unit has a focal length whose absolute value is $|f_1|$, said third lens unit has a focal length whose absolute value is $|f_3|$, and the ratio of $|f_1|$ to $f_{min}$ is less than about 0.9 and the ratio of $|f_3|$ to $f_{min}$ is less than about 1.0.

20. The zoom lens system of claim 7, 8, or 9 wherein said first lens unit has a power $\Phi_1$, said second lens unit has a power $\Phi_2$, said third lens unit has a power $\Phi_3$, and the sun of $\Phi_1+\Phi_2+\Phi_3$ is negative.

21. The zoom lens system of claim 7, 8, or 9 wherein the lens system has a back focal length BFL and a minimum effective focal length $f_{min}$, and the ratio of BFL to $f_{min}$ is greater than about 1.2.

22. The zoom lens system of claim 7, 8, or 9 wherein said aperture stop is on the image side of said third lens unit.

* * * * *